US006941464B1

(12) United States Patent
Barton et al.

(10) Patent No.: US 6,941,464 B1
(45) Date of Patent: Sep. 6, 2005

(54) METHOD AND LOGIC FOR CAPTURING AND ANALYZING CONDUIT DATA

(75) Inventors: Colleen A. Barton, Portola Valley, CA (US); Daniel Moos, Palo Alto, CA (US)

(73) Assignee: GeoMechanics International, Palo Alto, CA (US)

( * ) Notice: Subject to any disclaimer, the term of this patent is extended or adjusted under 35 U.S.C. 154(b) by 946 days.

(21) Appl. No.: 09/657,759

(22) Filed: Sep. 8, 2000

Related U.S. Application Data (63) Continuation-in-part of application No. 09/340,216, filed on Jun. 25, 1999.

(51) Int. Cl.[7] .............................................. G06F 11/30
(52) U.S. Cl. ........................ 713/193; 713/190; 367/81
(58) Field of Search ............................... 713/193, 200, 713/201, 167; 380/283, 278

(56) References Cited

U.S. PATENT DOCUMENTS

| | | | |
|---|---|---|---|
| 4,796,466 A | 1/1989 | Farmer | |
| 4,945,775 A | 8/1990 | Adams et al. | |
| 4,963,742 A | 10/1990 | Abernathy | |
| 4,998,208 A | 3/1991 | Buhrow et al. | |
| 5,078,006 A | 1/1992 | Maresca, Jr. et al. | |
| 5,148,110 A | 9/1992 | Helms | |
| 5,309,360 A | 5/1994 | Monk et al. | |
| 5,359,526 A | 10/1994 | Whittington et al. | |
| 5,412,729 A * | 5/1995 | Liu .............................. | 380/37 |
| 5,415,033 A | 5/1995 | Maresca, Jr. et al. | |
| 5,460,046 A | 10/1995 | Maltby et al. | |
| 5,504,331 A | 4/1996 | Lane et al. | |
| 5,675,251 A | 10/1997 | MacLean et al. | |
| 5,728,943 A | 3/1998 | Colter, Jr. et al. | |
| 5,764,231 A | 6/1998 | Ray et al. | |
| 5,813,798 A | 9/1998 | Whiffen | |
| 5,828,751 A | 10/1998 | Walker et al. | |
| 5,832,083 A | 11/1998 | Iwayama et al. | |
| 5,842,148 A | 11/1998 | Prendergast et al. | |
| 5,991,399 A * | 11/1999 | Graunke et al. ............ | 380/279 |
| 6,014,343 A | 1/2000 | Graf et al. | |

(Continued)

OTHER PUBLICATIONS

Jean E. Sammet; "Using Computer Graphics to Interpret Simulation Output"; Software Patent Institute Database of Software Technologies; Record 4, Serial No. acmr8109.0104; Sep. 1, 1981; 2 pgs.

(Continued)

*Primary Examiner*—Gregory Morse
*Assistant Examiner*—Andrew L. Nalven
(74) *Attorney, Agent, or Firm*—Madan, Mossman & Sriram, P.C.

(57) ABSTRACT

A method of locking data and a program that analyzes the data commences with a generation of a first key. This first key is associated with both the data and a specific, compiled copy of the program. A gatekeeper logic is generated. The gatekeeper logic utilizes at least the first key to prevent the specific, compiled copy of the program from analyzing data other than the specific data. In this way, the specific copy of the program is locked to specific data, and is accordingly limited to performing analysis operations utilizing the specific data.

77 Claims, 9 Drawing Sheets

U.S. PATENT DOCUMENTS

| | | | |
|---|---|---|---|
| 6,055,213 | A | 4/2000 | Rubbo et al. |
| 6,101,447 | A | 8/2000 | Poe, Jr. |
| 6,138,076 | A | 10/2000 | Graf et al. |
| 6,167,348 | A | 12/2000 | Cannon |
| 6,239,593 | B1 | 5/2001 | Burkhardt et al. |
| 6,243,483 | B1 | 6/2001 | Petrou et al. |
| 6,256,603 | B1 | 7/2001 | Celniker |
| 6,257,332 | B1 | 7/2001 | Vidrine et al. |
| 6,301,661 | B1 * | 10/2001 | Shambroom ............... 713/168 |
| 6,389,535 | B1 * | 5/2002 | Thomlinson et al. ....... 713/165 |
| 6,658,567 | B1 * | 12/2003 | Barton et al. ............... 713/193 |
| 2001/0014185 | A1 | 8/2001 | Chitradon et al. |

OTHER PUBLICATIONS

Jean E. Sammet; "Finding Structure in Co-Occurrence Matrice for Texture Analysis"; Software Patent Institute Database of Software Technologies; Record 1; Serial No. acmr8007.0154; Jul. 1, 1980; 3 pgs.

Aaron Finerman; "3.14 Earth Science"; Software Patent Institute Database of Software Technologies; Record 1, Serial No. acmr6610.0022; Oct. 1, 1966; 3 pgs.

Aaron Finerman, et al.; "(Part 60 of 196) Bibliography"; Software Patent Institute Database of Software Technologies; Record 2; Serial No. ACMR66.0066; 1967; 4 pgs.

True Seaborn; "Geographical Survey Computers Aid Energy Research"; Software Patent Institute Database of Software Technologies; Record 4; Serial No.IEEE1105.0136; May 1, 1978; 2 pgs.

True Seaborn; "Structure/Syntactic"; Software Patent Institute Database of Software Technologies; Record 5; Serial No. IEEE1512.0033; Dec. 1, 1982; 3 pgs.

Jean E. Sammet; "Pipeline"; Software Patent Institute Database of Software Technologies; Record 1; Serial No. ACMGC80.0135; 1984; 2 pgs.

* cited by examiner

METHOD AND LOGIC FOR CAPTURING AND ANALYZING CONDUIT DATA

This application is a continuation-in-part of application Ser. No. 09/340,216 filed on Jun. 25, 1999.

FIELD OF THE INVENTION

The present invention relates generally to the field of software and data distribution and, more specifically to the distribution of data and an associated analyzer program that analyzes the data to provide evaluations and assessments, the analyzer program being limited to analysis of the specific data.

BACKGROUND OF THE INVENTION

Pipelines are commonly used in the transportation of oil and gas. There are more than 300,000 miles of oil and gas pipelines in North America. Construction costs are now of the order of $1,000,000 per mile. The typical initial operating life of the pipelines are expected to be about 40 years, but 50% of the of the existing pipelines will be 40 years old at the year 2000.

Accurate monitoring of the pipelines is critical due to the potential risks to the environment when the pipelines rupture and due to the high costs of repair or replacement. Since oil and gas pipelines are normally buried, in-service inspection is performed by pumping a "smart electronic inspection pig" through the pipeline from one compressor station to the next.

Generally, the inspection tool detects and collects data indicating abnormalities (e.g., leakage, corrosion or metal loss) in the internal and external pipe surface or wall. The inspection tool may provide detailed signals about the condition of the pipelines. The signals are then converted to accurate estimates of defect size and geometry. This requires considerable expertise, as well as a detailed understanding of the effects of inspection conditions and the behavior of the type of pipeline steel used.

The information collected by the smart electronic inspection pig can be analyzed by an evaluation or analyzer software. The information can also be stored on a storage device such as, for example, a compact disc (CD) and can then be readily available for further analysis. The analyzer software typically reads large volumes of data generated during the inspection. The analyzer software may include a graphical user interface. Using the data collected during the inspection, the analyzer software may generally perform some data analysis and generates written and electronic reports or some form of graphical display.

Pipeline inspection activities or survey are generally performed by consulting firms such as pipeline assessment services performing both the data collection activity and the data analysis activity. An intelligent pigging survey is expensive and may cost some hundreds of thousand of dollars, with certain long distance, more complicated lines being charged well in excess of this.

It would be cost advantageous if the user of the pipeline inspection data, (e.g., an oil company) could be enabled to have control of both the pipeline inspection data and the analyzer program that analyze the pipeline inspection data. This way the inspection data can be analyzed as often as desired and at any time as desired. However, the cost of an analyzer program may be prohibitively expensive and economically unattractive.

SUMMARY OF THE INVENTION

According to one embodiment of the invention, there is provided a method of locking a specific data and an analyzer program that analyzes the specific data. A first key is generated and associated with the specific data and a specific copy of the analyzer program. A gatekeeper logic is generated. The gatekeeper logic utilizes at least the first key to prevent the specific copy of the analyzer program from analyzing any other data except for the specific data.

According to another embodiment of the invention, there is provided a method of locking a specific conduit data with a specific copy of an analyzer program that analyzes the specific conduit data. A first key is generated and associated with both the specific conduit data and the specific copy of the analyzer program. A gatekeeper logic is generated. The gatekeeper logic utilizes at least the first key to prevent the specific copy of the analyzer program from analyzing any other conduit data except for the specific conduit data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and logic for locking conduit data and an analyzer program that analyzes the conduit data are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "conduit" shall refer to any opening or cavity enclosed or surrounded by a structure having features, conditions or characteristics of a pipeline or pipeline-like environment such as, for example, an oil or gas pipeline, a sewer or other utility pipeline, a well or a bore hole. The structure may be generally vertical or horizontal or may form any angles with the ground level. The structure may be above ground, under ground, in land, under water, or any combination of these. Further, the term "data" shall be taken to include, but not limited to geomechanical, geophysical, in situ stress, petrophysical, geotechnical, acoustic wave form, magnetic wave resonance, vibration data, digital data or any other data derived using a logging device within the structure. The logging device may be a device that collects data such as, for example, a pig inspection device.

For the purposes of the present specification, the term "analyzer program" shall be taken to refer to any program that analyzes data for the purpose of presenting, interpreting or modifying the data. Accordingly, the operations performed by an analyzer program include, but are not limited to, the extraction of data, the generating of data, the interpretation of data, the display of data, the filtering of data, and the enhancing of data.

Figure 1:
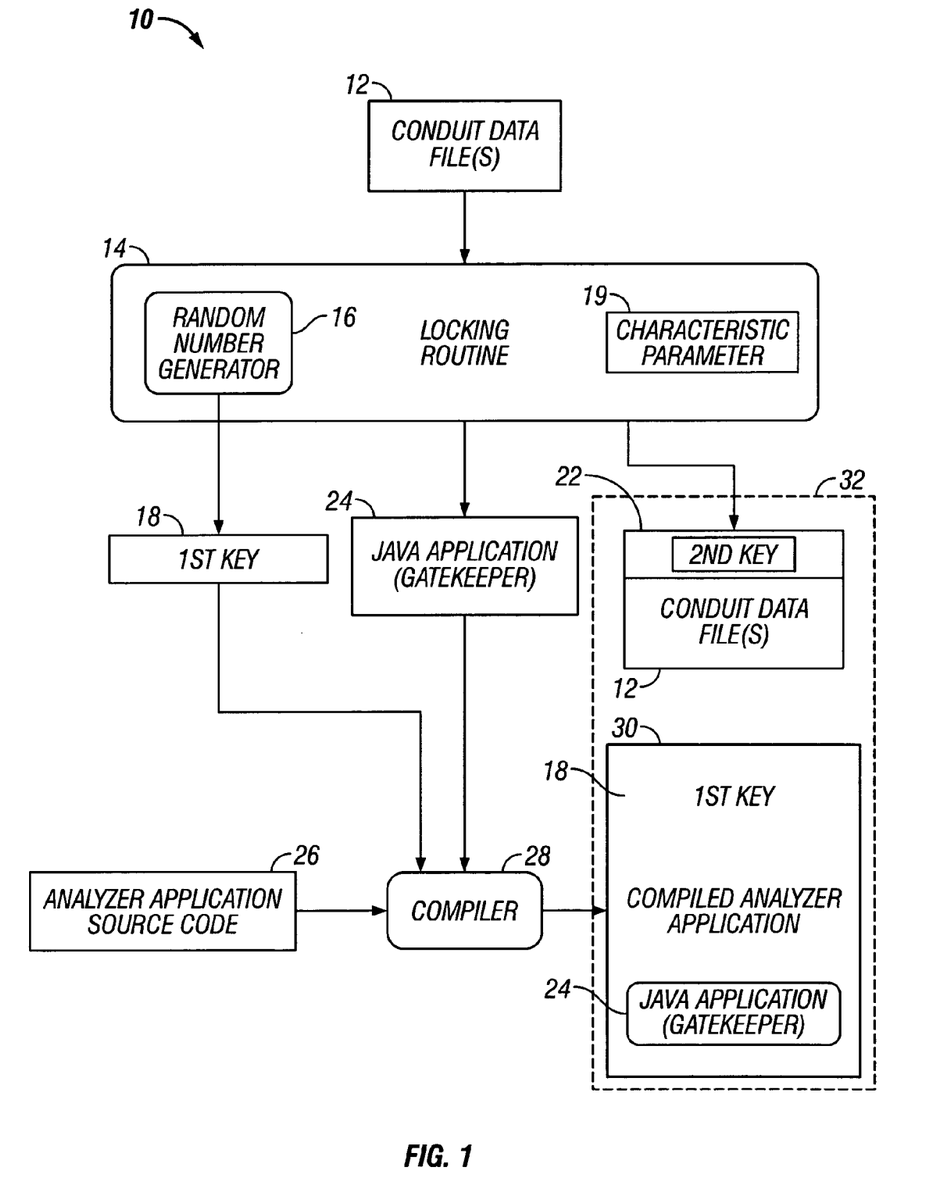
FIG. 1 is a block diagram illustrating an exemplary system for locking conduit data and an analyzer program that analyzes the conduit data.

FIG. 1 is a block diagram illustrating a system 10, according to an exemplary embodiment of the present invention, for locking conduit data and an analyzer program that analyzes the conduit data. The system 10 includes conduit data files 12 that may, for example, comprise logged acoustic data, electrical data, optical data, digital data, magnetic data or vibration data. The conduit data files 12 are inputted to an encryption or locking routine 14 that operates to lock the conduit data files 12 to a specific copy of an analyzer program. This enables the specific copy of the analyzer program only to analyze the specific conduit data files 12, and no other conduit data files. To this end, the locking routine 14 includes a random number generator 16 that generates a first key 18, which in one embodiment of the present invention comprises a simple random number. In another embodiment, the first key 18 may comprise any random character sequence.

The locking routine 14 also operates to identify a specific characteristic of each of the conduit data files 12, and to assign a characteristic value to a characteristic parameter indicative of the particular characteristic of each conduit data file 12. For example, the characteristic parameter may be the size of a conduit data file 12, and the characteristic value attributed to this parameter may be actual size of a conduit data file 12 expressed in bits, bytes or any other measure.

Further, the locking routine 14 generates a second key 22 for each of the conduit data files 12, which is associated with a respective conduit data file 12, utilizing the first key and the characteristic value for a respective file 12. For example, the logging routine 14 may simply exclusive OR (XOR) the first key and the characteristic parameter to generate the second key 22. The locking routine 14 then writes a respective second key 22 into a header portion of each of the files 12, as illustrated in FIG. 1. Alternatively, the second key 22 may be inserted into the conduit data files 12 in a manner that is not so easily discernable. For example, the second key 22 may be fractured into pieces that are inserted at predetermined locations throughout the conduit data files 12 by the locking routine 14.

Further, the locking routine 14 generates a gatekeeper application 24, in the exemplary form of a Java™ applet, which implements an "unlocking" function with respect to the conduit data files 12 and a specific copy of an analyzer program. This is to permit the analyzer program to analyze the conduit data files. Further information regarding the gatekeeper application 24 is provided below.

A compiler 28 compiles the source code 26 of the analyzer program to generate a specific compiled copy of the analyzer application 30 that incorporates the first key 18 and the gatekeeper application 24. The source code 26 for the analyzer program can be provided by a software developer such as, for example, the GMI-Imager software developed by GeoMechanics International, Incorporated of Palo Alto, Calif.

The conduit data files 12 and the compiled analyzer application 30 may together comprise a single package 32 that is supplied to an end user. For example, the conduit data files 12 and the compiled copy of the analyzer application 30 may be written to a single compact disk (e.g., CD) that is supplied to the end user. Alternatively, the conduit data files 12 and the specific copy of the analyzer application 30 may be propagated to an end user from a source over a network.

In one embodiment, a single first key 18 may be utilized by the locking routine 14 to generate multiple distinct second keys 22 for each of the conduit data files 12. This may be achieved by performing an operation utilizing the first key 18 and a specific characteristic value for each distinct file of the conduit data files 12 to generate a distinct second key 22 for each such distinct conduit data file. Accordingly, the package 32 may comprise a single copy of the compiled analyzer application 30 that is able to analyze each of the multiple conduit data files 12, each having a different and unique second key 22.

Figure 2:
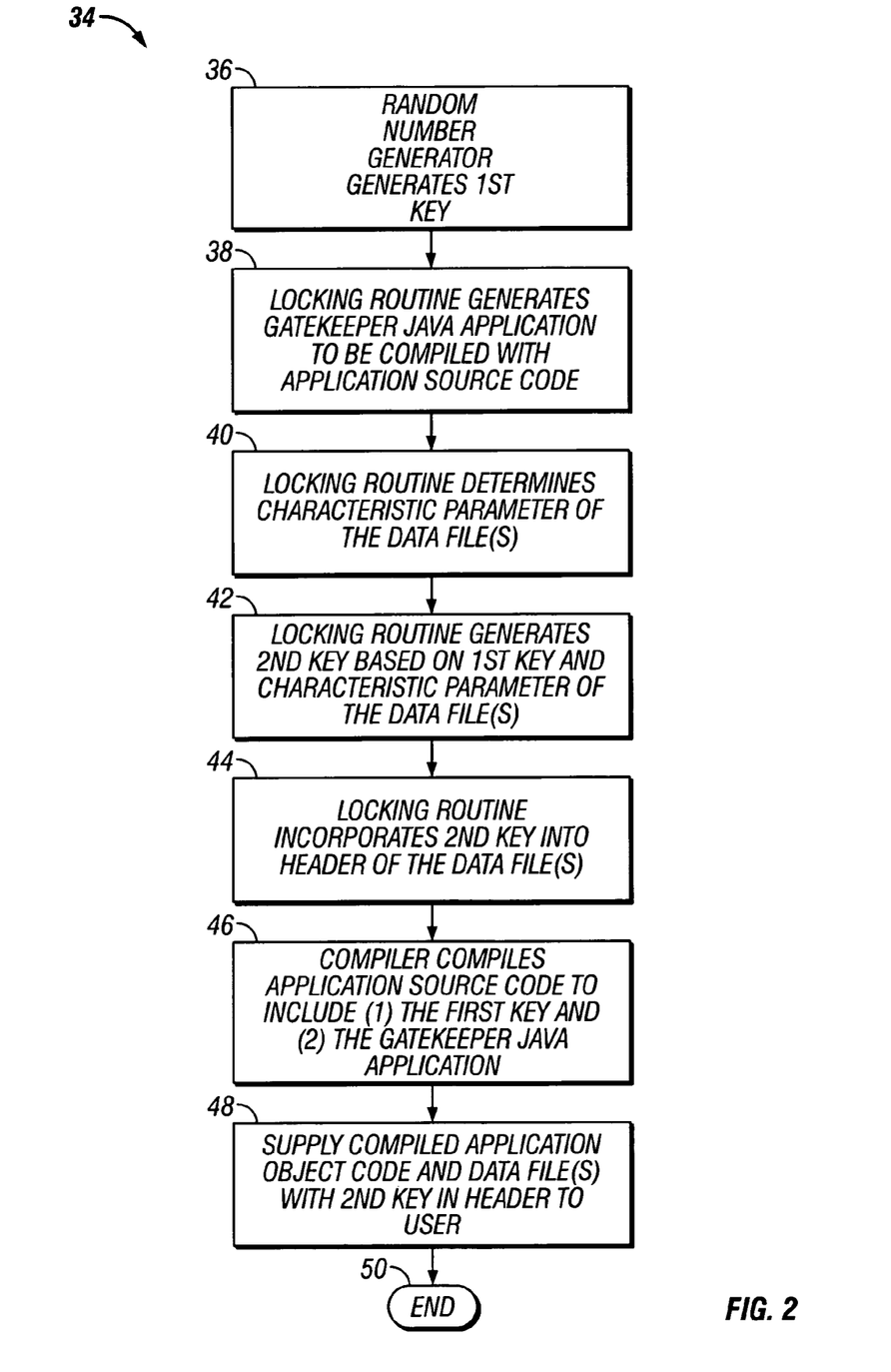
FIG. 2 is a flow chart illustrating a method, according to an exemplary embodiment of the present invention, of locking conduit data and an analyzer program so that a specific copy of the analyzer program is enabled to analyze only specific conduit data.

FIG. 2 is a flow chart illustrating a method 34, according to an exemplary embodiment of the present invention, of locking conduit data and an analyzer program so that a specific copy of the analyzer program is enabled to analyze only the specific conduit data.

The method commences at block 36, with the generation of the first key 18 by the random number generator 16. At block 38, the locking routine 14 generates the gatekeeper application 24 that is to be compiled with the analyzer application source code 26 (e.g., the analyzer program). At block 40, the locking routine 14 determines a characteristic value for a characteristic parameter of at least one conduit data file 12. As discussed above, the locking routine 14 may determine a respective characteristic value for a number of conduit data files 12. The characteristic value may be, for example, the size of a respective conduit data file.

At block 42, the locking routine 14 then generates a respective second key 22 for each conduit data file 12 utilizing the first key 18 and the respective characteristic value 19 for the respective conduit data file 12. For example, the second key 22 may be generated for the respective conduit data file 12 by performing an exclusive—or (XOR) operation between the first key 18 and the characteristic value 19 for each respective conduit data file 12.

At block 44, the locking routine 14 incorporates the second key 22 into the header of each respective conduit data file 12. As discussed above, in an alternative embodiment, a second key 22 for each respective conduit data file 12 may be distributed throughout the file 12 at predetermined and known locations. At block 46, the compiler 28 then compiles the analyzer application source code 26 together with the first key 18 and the gatekeeper application 24 and generates a specific compiled copy of the analyzer application 30. At block 48, the specific compiled copy of the analyzer application 30 and the conduit data files 12 that the analyzer application can access and analyze, are supplied to the end user as the package 32. The method 34 then ends at block 50.

Figure 3A:
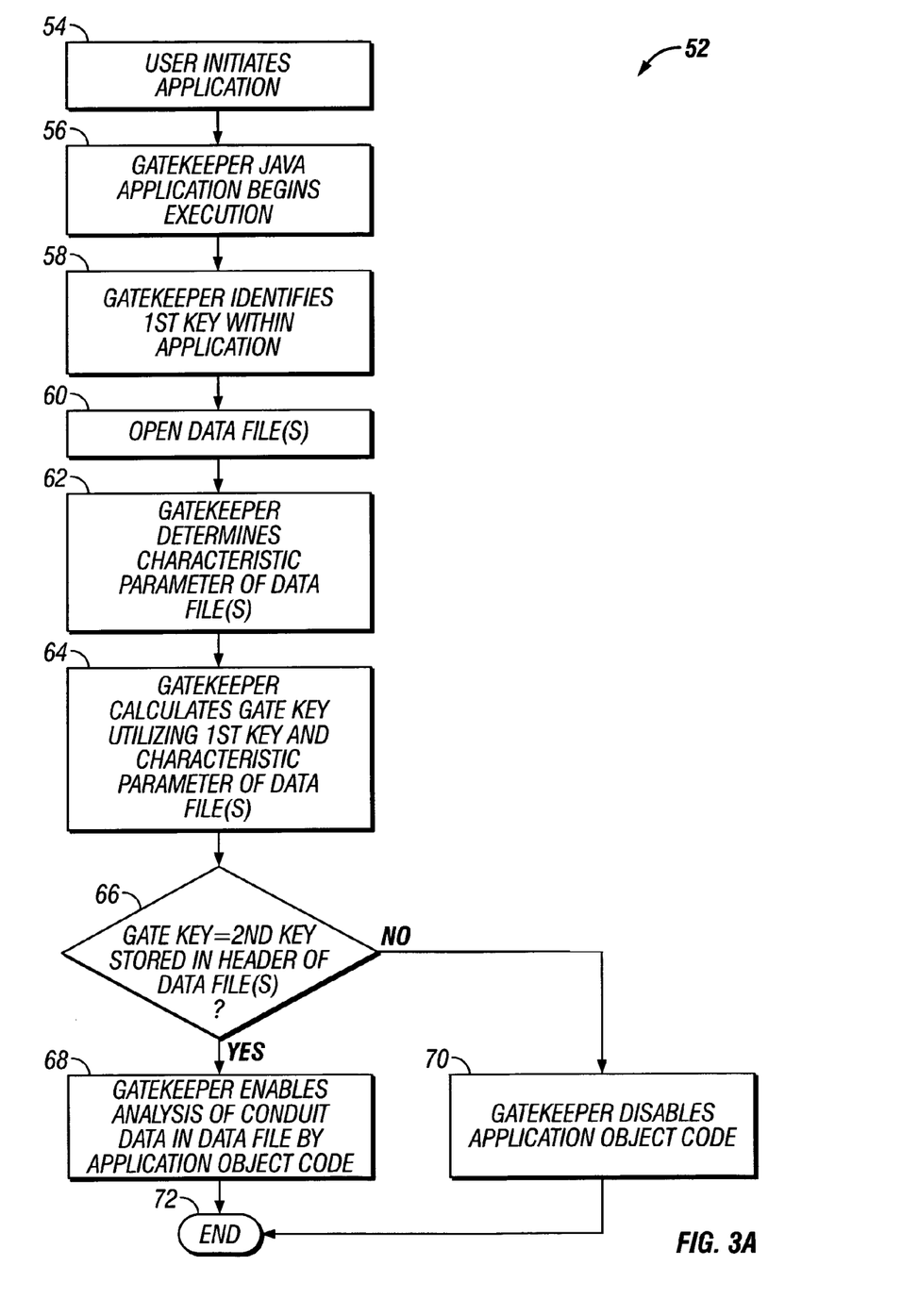
FIG. 3A is a flow chart illustrating a method, according to an exemplary embodiment of the present invention, of executing an analyzer program to analyze conduit data to which it is locked.

FIG. 3A is a flow chart showing a method 52, according to an exemplary embodiment of the present invention, of executing an analyzer program to analyze conduit data to which it is locked.

The method 52 commences at block 54, with the initiation or launch by an end user of the specific compiled copy of the analyzer application 30 shown in FIG. 1 and supplied to the user at block 48 of the method 34 illustrated in FIG. 2. At block 56, the gatekeeper application 24 begins execution and it identifies the first key 18 within the specific copy of the analyzer application 30. At block 60, the gatekeeper application 24 opens the conduit data files 12 and, at block 62, determines a characteristic value for a characteristic parameter of each of the conduit data files 12. For example, the gatekeeper application 24 may ascertain the size of each of the conduit data files 12.

At block 64, the gatekeeper application 24 calculates a gate key for each of the conduit data files 12 utilizing the first key identified at block 58 and the respective characteristic value for characteristic parameter for each of the conduit data files 12. The calculation of the gate key is the same as the calculation of the second key 22 described in FIG. 1 and at block 42 of FIG. 2. For example, the gate key may be calculated by performing a XOR operation utilizing the first key 18 and the determined characteristic value for the characteristic parameter for each of the conduit data files 12.

At decision block 66, a determination is made as to whether the gate key generated for each of the conduit data files 12 corresponds to a respective second key 22 stored, for example, in the header portion of the respective conduit data file 12. Following a positive determination at decision box 66, for a specific conduit data file 12, the gatekeeper application 24 enables analysis of the specific conduit data file 12 by the specific copy of the analyzer application 30. On the other hand, following a negative determination for a specific conduit data file 12 at decision box 66, the gatekeeper application 24 disables the specific copy of the analyzer application 30 from analyzing the relevant data file 12. The negative determination occurs when the user attempt to use the specific copy of the analyzer application with a conduit data file other than the conduit data files 12. The method 52 then ends at block 72.

Figure 3B:
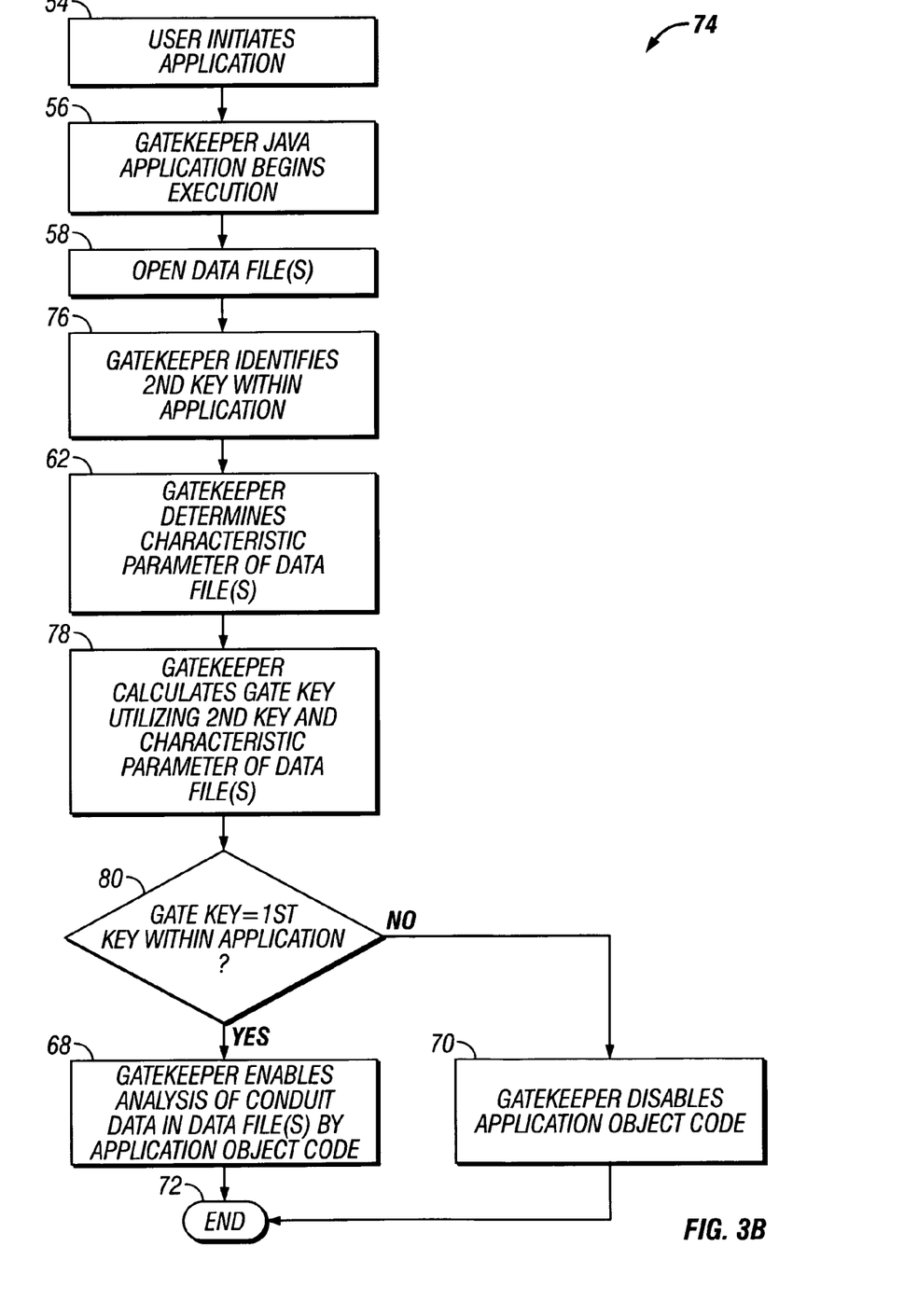
FIG. 3B is a flow chart illustrating an alternative method, according to an exemplary embodiment of the present invention, of executing an analyzer program to analyze conduit data to which it is locked.

FIG. 3B is a flow chart illustrating an alternative method 74, according to an exemplary embodiment of the present invention, of executing an analyzer program to analyze conduit data to which it is locked.

The method 74 corresponds substantially to the method 52 discussed above with respect to FIG. 3A. They are different in that at block 76, the gatekeeper application 24 identifies the second key 22 of a specific conduit data file 12, and then at block 78 calculates the gate key utilizing this second key 22 and the characteristic value of the relevant file 12. At decision box 80, the gatekeeper application 24 makes a determination as to whether the gate key corresponds to the first key 18 embedded within the specific copy of the analyzer application 30. This decision is to determine whether or not the specific copy of the analyzer application 30 will be enabled to analyze the relevant conduit data file 12.

In summary, the methods 52 and 74 differ in that, in the method 52, the first key 18 is utilized together with the characteristic parameter to determine the gate key which is then compared to the second key 22 stored within the conduit data file 12. In the method 74, the second key 22 is utilized to generate the gate key, that is then compared to the first key 18 embedded within the compiled and specific copy of the analyzer application 30.

Figure 4A:
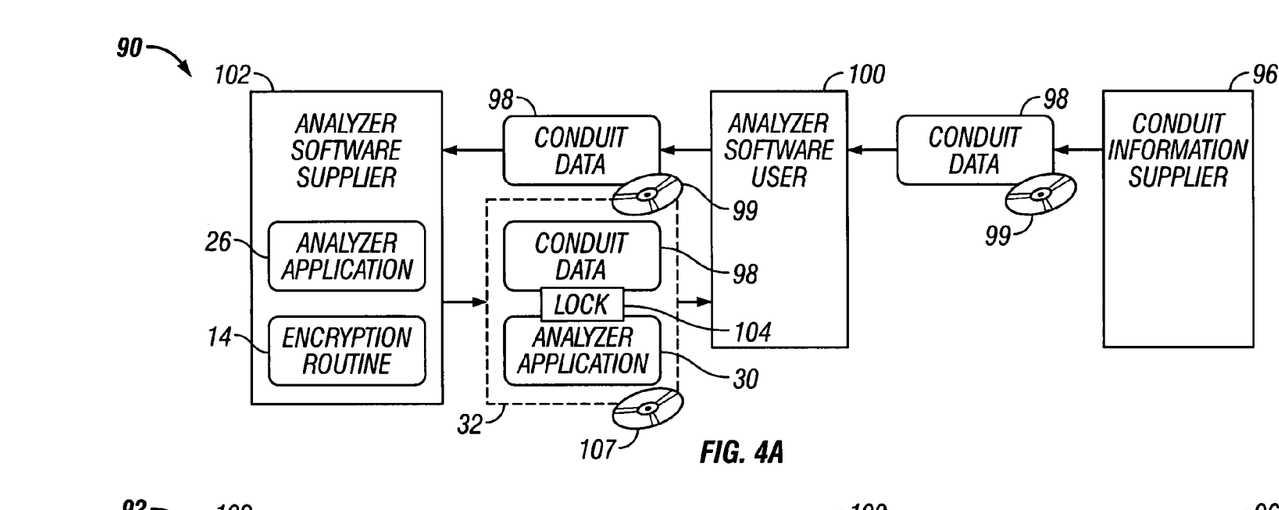
FIGS. 4A–4C illustrate methods, according to alternative embodiments of the present invention, of distributing conduit data and an analyzer program that analyzes the conduit data to an end user of the conduit data conduit data conduit data and the analyzer program.
Figure 4B:
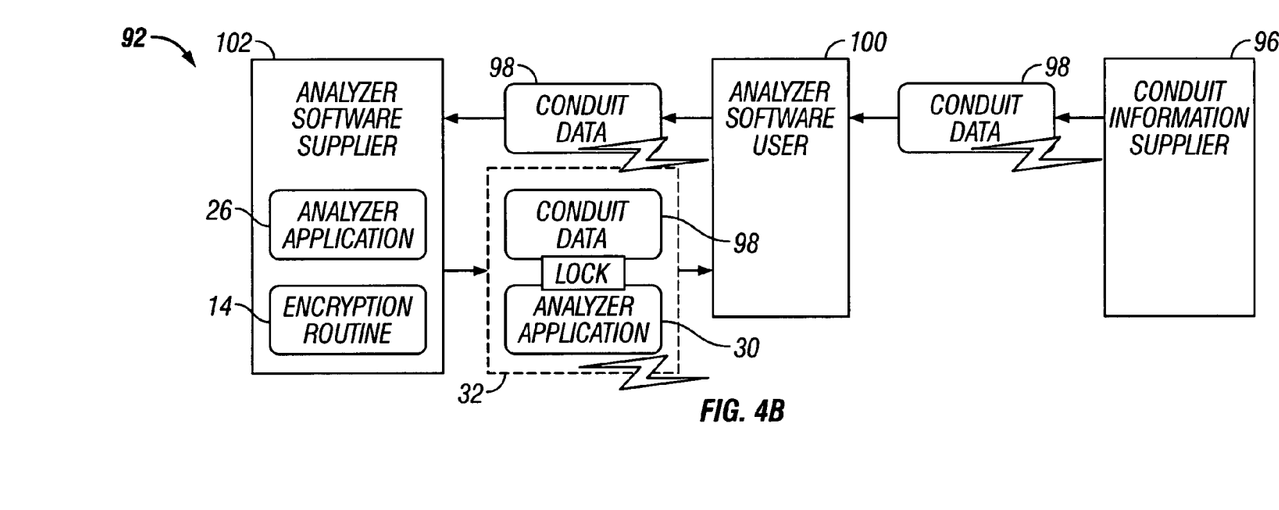
Figure 4C:
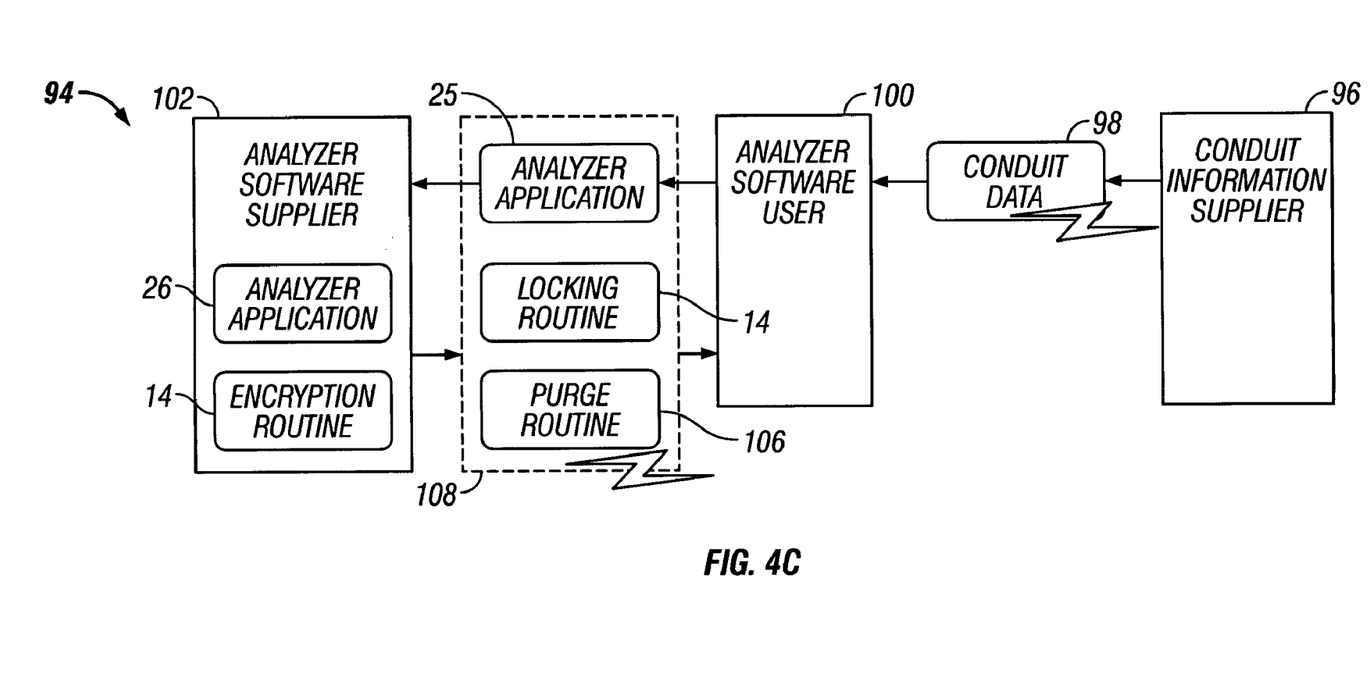

FIGS. 4A–4C illustrate methods 90, 92 and 94, according to alternative embodiments of the present invention, of distributing conduit data and an analyzer program that analyzes the conduit data to the end user of the conduit data and the analyzer program.

Referring first to FIG. 4A, conduit data 98 may be provided by a conduit inspection service company 96 such as, for example, BlackHawk Pipeline Assessment Services of Atlanta, Ga., to the end user 100. Conduit data 98 may be stored on a compact disk (CD) 99. The end user 100 then provides the conduit data 98 on the CD 99 to the analyzer software supplier 102.

Having received the conduit data 98 from the end user 100, the analyzer software supplier 102 will then proceed, utilizing the locking (or encryption) routine 14 to compile the analyzer application source code 26 to include the conduit data 98 and the locking (or encryption) routine 14 to thereby generate the package 32. As described above with reference to FIG. 1, the package 32 comprises object code that constitutes a compiled specific copy of the analyzer application 30, and one or more conduit data files 12. The gatekeeper application 24, in conjunction with the first and second keys 18 and 22, constitutes a lock 104 illustrated in FIG. 4A. The package 32 may be written to a compact disk 107, that is then supplied back to the end user 100.

Utilizing the compact disk 107, the end user 100 may then execute the analyzer application 30 to analyze only the conduit data 98. Except for the conduit data 98, the compiled analyzer application 30 will not work with any other conduit data.

The above-discussed method 90 of distribution of the locked compiled analyzer application 30 and conduit data 98 is advantageous to the analyzer software supplier 102. The analyzer software supplier 102 is able to incrementally recover the cost of the analyzer application by supplying multiple copies of an analyzer application 30 to the end user 100. Each analyzer application copy is locked to the specific conduit data 98. Each compiled and specific copy of the analyzer application 30 is supplied at a reduced price relative to the cost of supply of an unencumbered or "unlocked" analyzer program that is not limited to the specific conduit data 98, and that would be able to analyze any given conduit data. By supplying numerous copies of compiled specific analyzer applications 30 to the end user, the analyzer software supplier 102 will thus be able to generate a steady revenue flow from the end user 100 and recover a "full" price for the program over time.

From the point of view of the end user 100, the distribution method 90 discussed above with reference to FIG. 4A is advantageous. Instead of being required to buy an "unlocked" copy of the analyzer program 26 for a relatively high (and sometimes unaffordable) cost, the end user 100 incurs incremental and time-distributed costs for use of the analyzer program. A further benefit to the end user 100 is that the distribution method 90 implements an alternative to a "pay-per-use" system. This provides advantages in that the cost to the end user 100 of the analyzer application 30 is linked to the usage and value to the company of the specific conduit data 98.

FIG. 4B shows an alternative method 92 of distributing conduit data and an analyzer program that analyzes the conduit data to an end user 100. The method 92 corresponds substantially to the method 90 with reference to FIG. 4A. However, instead of the conduit data 98 being propagated between the conduit inspection service company 96, the end user 100 and the analyzer software supplier 102 on a compact disk, the relevant data and applications are transmitted via a network (not shown). The network may be a wire or wireless, and may comprise the Internet, a Wide Area Network (WAN) or a Local Area Network (LAN). The method 92 may provide some cost advantages over the method 90, and may also be more convenient in certain circumstances.

FIG. 4C shows a further method 94 of distributing conduit data and an analyzer program, which are locked, to an end user 100. While the conduit inspection service company 96 provides the conduit data 98 to the end user 100, as in the methods 90 and 92 above, this conduit data 98 is not provided to the analyzer software supplier 102. In the method 94, the analyzer software supplier 102 provides a further package 108 to the end user 100, the package 108 including a copy-protected and read-protected copy of the analyzer application source code 26, a copy of the locking routine 14, and a purge routine 106. The end user 100 then executes the locking routine 14 to enable the analyzer application 30 locally to generate the first key 18, the gatekeeper application 24 and the second key 22. Following compilation of a specific and compiled copy of the analyzer application 30, and the embedding of the second key 22 within a conduit data file 12, the purge routine 106 will then automatically be invoked to purge the locking routine 14 and the analyzer application source code 26 from a computer system operated by the end user 100. The end user 100 will then retain only the package 32, the other software having been purged from a relevant computer system by the purge routine 106.

The method 94 illustrated in FIG. 4C is advantageous in that it is not required that the conduit data 98 be provided from the end user 100 to the analyzer software supplier 102. On the other hand, the generation of the locked analyzer application 30 and conduit data 98 at an end-user site may be undesirable, and may be unattractive to an end user 100.

Figure 5:
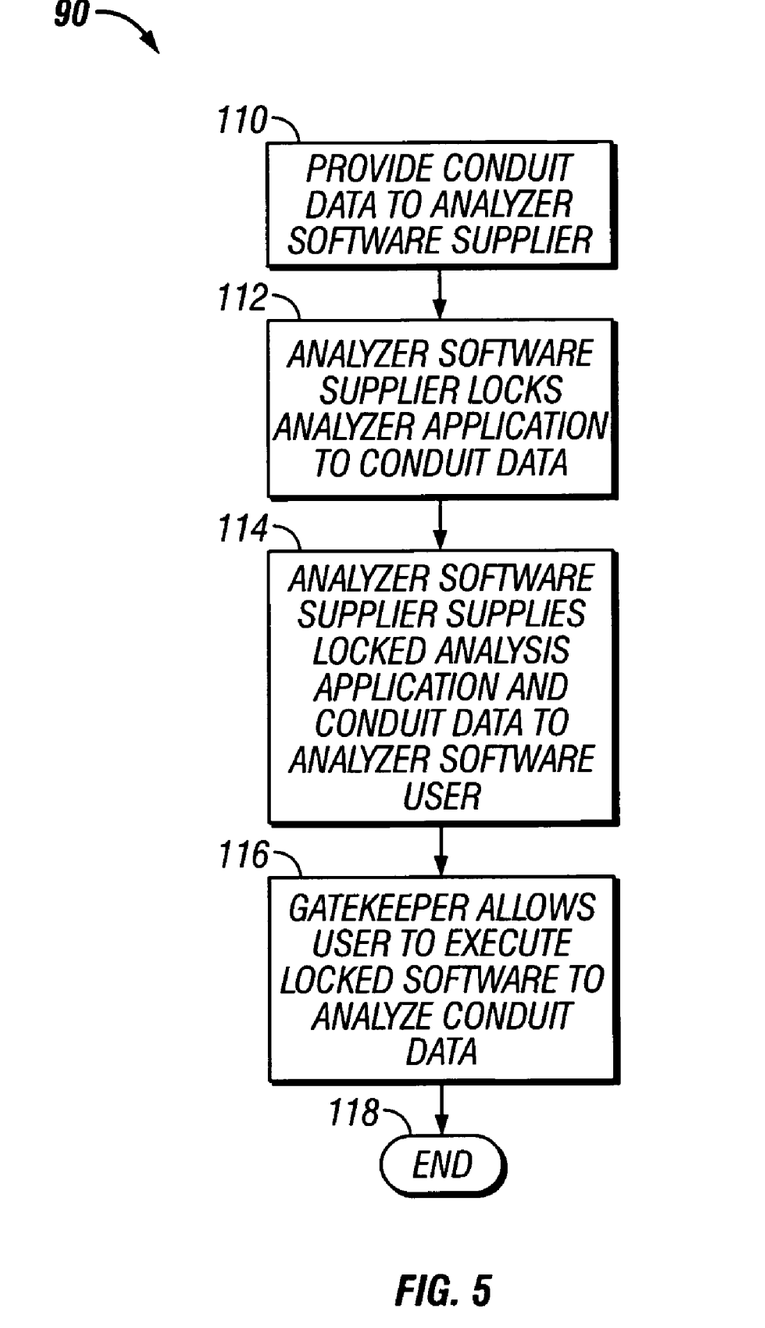
FIG. 5 is a flow chart illustrating a method, according to an exemplary embodiment of the present invention, that may be performed by a conduit assessment service provider, an end user, and an analyzer program software supplier to implement the method illustrated in FIGS. 4A–4C.

FIG. 5 is a flow chart illustrating the steps performed by the conduit inspection service company 96, the end user 100 and the analyzer software supplier 102 as described above with reference to FIG. 4. At block 110, the conduit data 98 is provided to the analyzer software supplier 102 from the conduit inspection service company 96 via the end user 100. At block 112, the analyzer software supplier 102 then locks the analyzer application 30 to the conduit data 98. At block 114, the analyzer software supplier 102 supplies the locked analyzer application 30 and conduit data 98 to the end user 100. At block 116, the gatekeeper application 24, embedded within the analyzer application 30, allows a user to execute the locked software to analyze only the specific conduit data 98.

The method 90 described above with reference to FIG. 5 also embodies the processes performed when executing the method 92 discussed above with reference to FIG. 4B.

Figure 6:
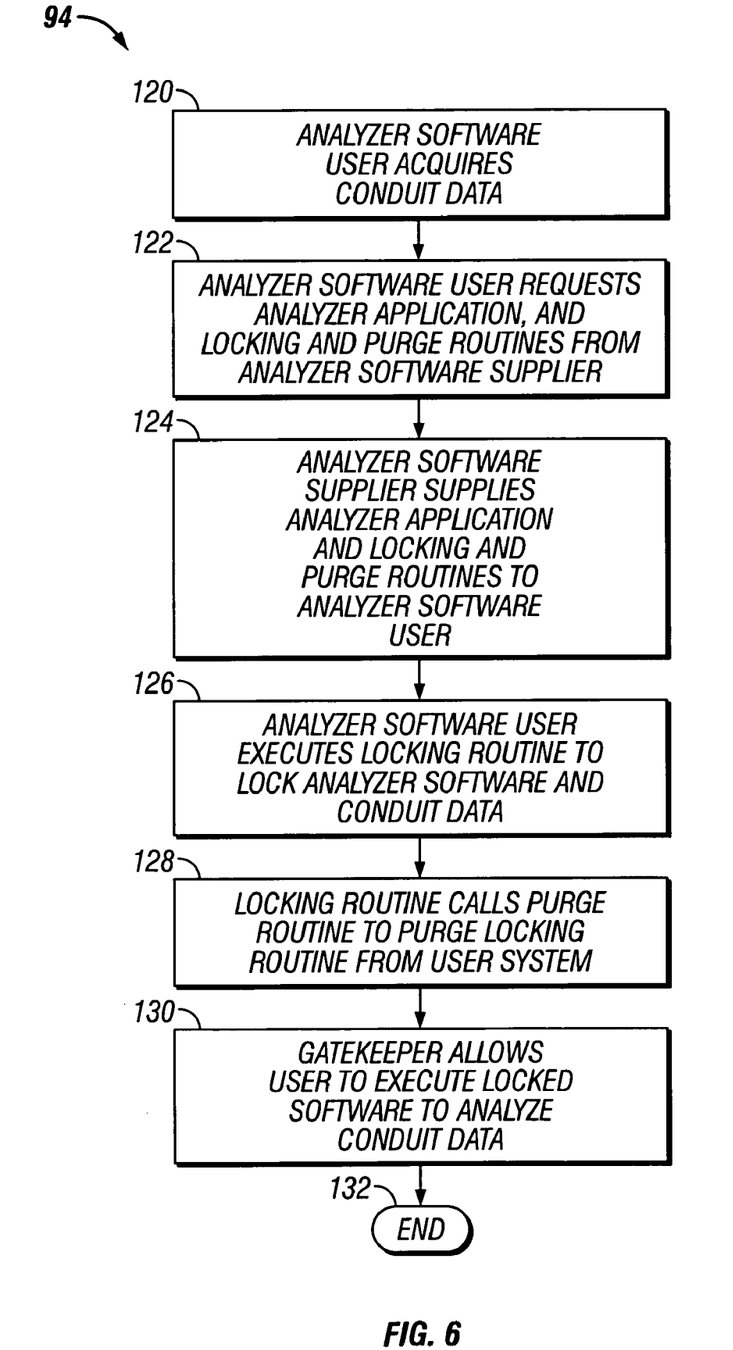
FIG. 6 is a flow chart illustrating a method, according to an exemplary embodiment of the present invention, of distributing conduit data and an analyzer program to an end user.

FIG. 6 is a flow chart illustrating a method 94, according to an exemplary embodiment of the present invention, of distributing conduit data and an analyzer program to an end user. The method 94 is performed by the conduit inspection service company 96, the end user 100 and the analyzer software supplier 102.

At block 120, the end user 100 acquires the conduit data 98 from the conduit inspection service company 96. At block 112, the end user 100 requests an analyzer application source code 26, as well as the locking and purging routines 14 and 106, from the analyzer software supplier 102. At block 124, the analyzer software supplier 102 supplies the analyzer application source code 26, which is copy and read protected, to the end user 100. The supplier 102 also provides the locking routine 14 and purge routine 106. At block 126, the end user 100 then executes the locking routine 14 to lock the conduit data 98 to a specific and compiled copy of the analyzer application 30. This may involve generating the gatekeeper application 24, and performing a compile operation utilizing a compiler 28 as described with reference to FIG. 1.

At block 128, the locking routine 14 calls the purge routine 106 to purge the locking routine and the analyzer application source code 26 from the computer system of the end-user 100. At block 130, the gatekeeper application 24 allows the end user 100 to execute the analyzer application 30 to analyze the conduit data 98, and no other conduit data, to which is locked. The method 94 then ends at block 132.

Figure 7:
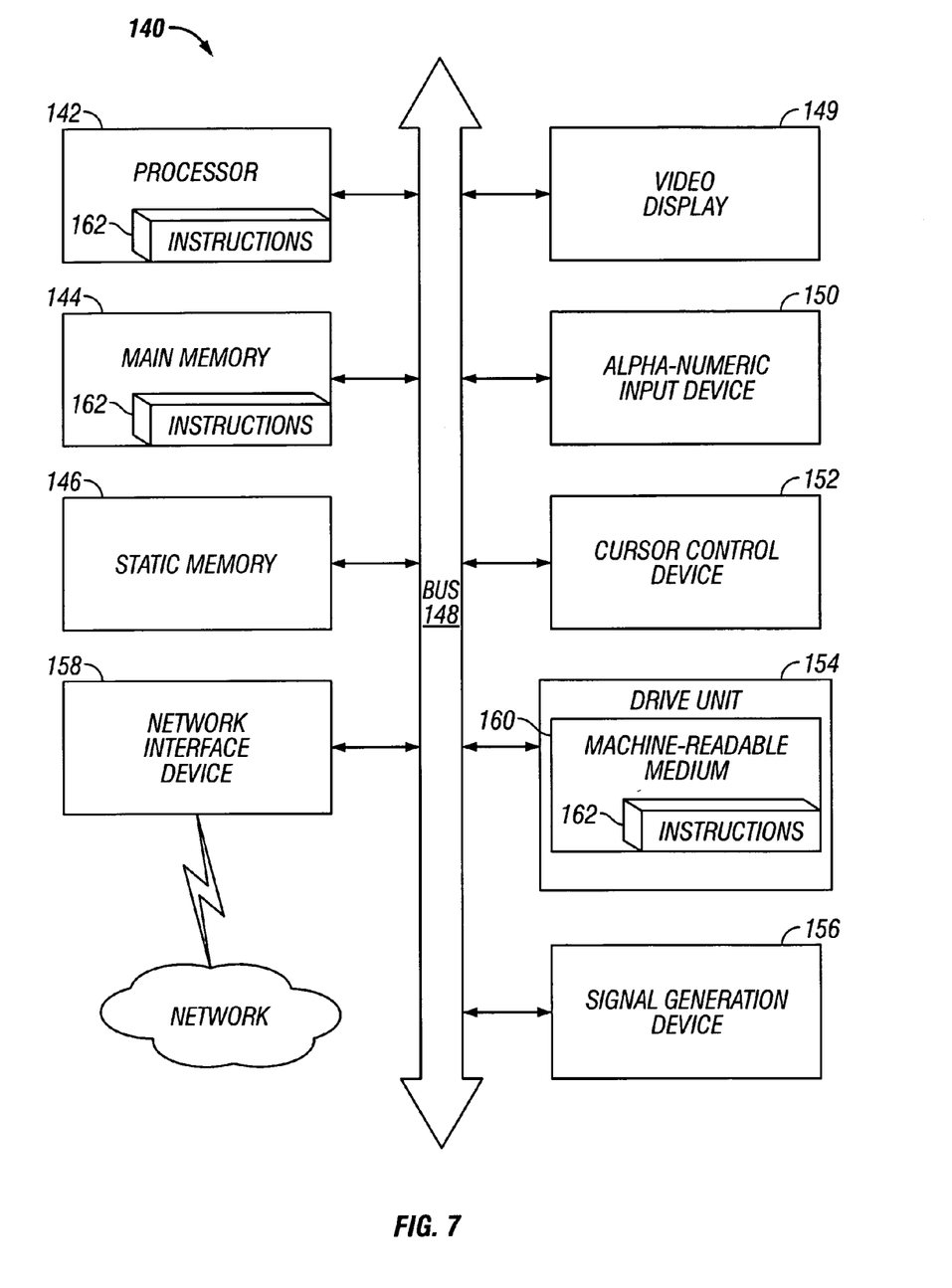
FIG. 7 is a block diagram illustrating a machine, in the exemplary form of a computer system, within which a set of instructions for causing the computer system to perform any of the methodologies discussed above may be executed.

FIG. 7 is a block diagram illustrating a machine, in the exemplary form of a computer system 140, within which a set of instructions, for causing the computer system 140 to perform any one of the methodologies discussed above, may be executed. The computer system 140 includes a processor 142, a main memory 144, and a static memory 146 that communicate with each other via a bus 148. The computer system 140 further includes a video display unit 149 (e.g., a liquid crystal display (LCD) or a cathode ray tube (CTR)). The computer system 140 further includes an alpha-numeric input device 150 (e.g., a keyboard), a cursor control device 152 (e.g., a mouse), a disk drive unit 154, a signal generation device 156 (e.g., a speaker) and a network interface device 158.

The disk drive unit 154 includes a machine-readable medium 160 on which is stored a set of instructions (i.e., software 162) embodying any one, or all, of the methodologies discussed above. The software 162 is also shown to reside, completely or at least partially, within the main memory 144 and/or within the processor 142. The software 162 may furthermore be transmitted or received via the network interface device 158.

For the purposes of this specification, the term "machine-readable medium" shall be taken to include any medium which is capable of storing or embodying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and logic for locking conduit data and an analyzer data program that analyzes the conduit data have been described. Although the present invention has been described with reference to specific exemplary embodiments, the present invention can also be practiced with any analyzer program being locked with any respective data to provide the end users the same advantages discussed above. For example, a sales person can purchase marketing data for a specific region locked together with an analyzer program that provides analyses of the same marketing data.

It will be evident that various modifications and changes may be made to these embodiments without departing from the broader spirit and scope of the invention. Accordingly, the specification and drawings are to be regarded in an illustrative rather than a restrictive sense.

What is claimed is:

1. A method of locking conduit data and an analyzer program that analyzes the conduit data, the method including:
   generating a first key;
   associating the first key with both specific conduit data and a specific copy of the analyzer program; and
   generating a gatekeeper logic that, utilizing at least the first key, prevents the specific copy of the analyzer program from analyzing conduit data other than the specific conduit data.

2. The method of claim 1 wherein generating the first key includes generating a random character sequence.

3. The method of claim 2 wherein the random character sequence is a random number sequence.

4. The method of claim 1 wherein associating the first key with the specific conduit data includes generating a second key utilizing the first key and a characteristic value for a characteristic parameter representative of a characteristic of the specific conduit data.

5. The method of claim 4 including, responsive to a modification of the characteristic value, re-generating the second key utilizing the modified characteristic value.

6. The method of claim 4 including incorporating the second key within a header of a data file including the specific conduit data.

7. The method of claim 1 wherein associating the first key with the specific copy of the analyzer program includes compiling the specific copy of the analyzer program to incorporate the first key.

8. The method of claim 1 wherein generating the gatekeeper logic includes associating the gatekeeper logic with the specific copy of the analyzer program.

9. The method of claim 8 wherein associating the gatekeeper logic with the specific copy of the analyzer program includes compiling the specific copy of the analyzer program to incorporate the gatekeeper logic.

10. The method of claim 1 wherein generating the gatekeeper logic comprises generating a Java-programming language application that is incorporated within the specific copy of the analyzer program.

11. The method of claim 1 wherein a user of the analyzer program supplies the specific conduit data to a supplier of the analyzer program, and a locking of the specific conduit data to the specific copy of the analyzer program occurs on a computer system of the supplier.

12. The method of claim 11 wherein the supplier provides the locked specific conduit data and the specific copy of the analyzer program to the user.

13. The method of claim 1 wherein a supplier of the analyzer program supplies locking logic and the analyzer program to a user of the analyzer program, and a locking of the specific conduit data to the specific copy of the analyzer program occurs on a computer system of the user utilizing the supplied locking logic and the supplied analyzer program.

14. The method of claim 1, wherein the conduit data includes logged pipeline data collected from a pipeline.

15. The method of claim 14, wherein the pipeline is a gas pipeline.

16. The method of claim 14, wherein the pipeline is an oil pipeline.

17. The method of claim 14, wherein the pipeline is a sewer pipeline.

18. The method of claim 14, wherein the pipeline is a utility pipeline.

19. A method of executing an analyzer program to analyze conduit data to which it is locked, the method including:
   determining a first key associated with a specific copy of an analyzer program;
   determining a second key associated with specific conduit data;
   determining a characteristic parameter representative of a characteristic of the specific conduit data;
   deriving a gate key utilizing the second key and the characteristic parameter; and
   allowing execution of the specific copy of the analyzer program to analyze the specific conduit data if the gate key corresponds to the first key.

20. A method of executing an analyzer program to analyze conduit data to which it is locked, the method including:
   determining a first key associated with a specific copy of an analyzer program;
   determining a second key associated with specific conduit data;
   determining a characteristic parameter representative of a characteristic of the specific conduit data;
   deriving a gate key utilizing the first key and the characteristic parameter; and
   allowing execution of the specific copy of the analyzer program to analyze the specific conduit data if the gate key corresponds to the second key.

21. A method of distributing conduit data and an analyzer program that analyzes the conduit data, the method including:
   providing a user of the analyzer program with a specific copy of the analyzer program and specific conduit data that are locked utilizing at least a first key; and
   providing the user of the analyzer program with a gatekeeper logic that, utilizing at least the first key, allows the specific copy of the analyzer program to analyze only the specific conduit data, wherein the first key is associated with both the specific copy of analyzer program and the specific conduit data.

22. The method of claim 21 wherein providing the gatekeeper logic includes compiling the specific copy of the analyzer program to include the gatekeeper logic, and providing the user with the compiled specific copy of the analyzer program.

23. The method of claim 21 wherein associating the first key with the specific copy of the analyzer program includes compiling the specific copy of the analyzer program to include the first key.

24. The method of claim 21 wherein associating the first key with the specific conduit data includes determining a characteristic value for a characteristic parameter representative of a characteristic of the specific conduit data, generating a second key utilizing the first key and the characteristic value, and including the second key within the specific conduit data.

25. A method of distributing conduit data and an analyzer program that analyzes the conduit data, the method including:
   providing a user of the analyzer program with a specific copy of the analyzer program;
   providing the user of the analyzer program with a locking logic that locks the specific copy of the analyzer program to selected conduit data; and providing the user of the analyzer program with a gatekeeper logic that allows the specific copy of the analyzer program to analyze only the selected conduit data.

26. A method of distributing conduit data and an application program that accesses the conduit data, the method including:
  locking a specific copy of the application program to specific conduit data so that the specific copy of the application program is able to access only the specific conduit data; and
  distributing the locked specific copy of the application program and specific conduit data to a user.

27. The method of claim 26 wherein locking the specific copy of the application program to the specific conduit data includes generating a first key that is associated with both the specific copy of the application program and the specific conduit data.

28. The method of claim 27 wherein generating the first key comprises generating a random key utilizing a random character generator.

29. The method of claim 27 wherein generating the first key comprises generating a random number using a random number generator.

30. The method of claim 26 wherein locking the specific copy of the application program to the specific conduit data includes generating a second key that is associated with the specific conduit data, the second key generated utilizing the first key and a first characteristic parameter representative of a characteristic of the specific conduit data.

31. The method of claim 26 wherein locking the specific copy of the application program to the specific conduit data includes generating a gatekeeper application that allows utilization of the specific copy of the application program when accessing the specific conduit data, and disallows utilization of the application program when accessing other conduit data.

32. The method of claim 26 wherein locking the specific copy of the application program to the specific conduit data includes compiling source code for the application program, together with the first key and the gatekeeper application, into compiled object code for the specific copy of the application program.

33. The method of claim 31 including distributing the gatekeeper application to the user, the gatekeeper application accessing at least the first key for the purposes of allowing or disallowing utilization of the specific copy of the application program.

34. The method of 33 wherein the gatekeeper determines a second characteristic parameter representative of the characteristic of the specific conduit data, generates a gate key utilizing the first key and the second characteristic parameter, and compares the gate key to the second key for the purposes of allowing or disallowing user utilization of the specific copy of the application program.

35. The method of claim 26 wherein locking is performed by a locking logic, and the method includes sending the specific conduit data from the user to a software supplier, the software supplier executing the locking logic to lock the specific copy of the application program to the specific conduit data so that the specific copy of the application program is able to access only the specific conduit data.

36. The method of claim 26 including sending the locked specific copy of the application program and specific conduit data from the user to the software supplier.

37. The method of claim 36 wherein sending comprises propagating the specific conduit data over a communications network.

38. The method of claim 36 wherein sending comprises supplying the software supplier with a physical storage medium that stores the specific conduit data.

39. The method of claim 26 wherein locking is performed by a locking logic, the method includes sending the locking logic and the application program from a software supplier to the user, the user executing the locking logic to lock the specific copy of the application program to the specific conduit data so that the specific copy of the application program is able to access only the specific conduit data.

40. The method of claim 39 including purging the locking logic from a computer system of the user subsequent to the locking of the specific copy of the application program to the specific conduit data.

41. The method of claim 39 wherein sending comprises propagating the locking logic and the application program over a communications network.

42. The method of claim 39 wherein sending comprises supplying the user with a physical storage medium that stores the locking logic and the application program.

43. The method of claim 26, wherein the conduit data includes logged pipeline data collected from a pipeline.

44. The method of claim 43, wherein the pipeline is a gas pipeline.

45. The method of claim 43, wherein the pipeline is an oil pipeline.

46. The method of claim 43, wherein the pipeline is a sewer pipeline.

47. The method of claim 43, wherein the pipeline is a bore hole.

48. The method of claim 43, wherein the pipeline is a drill hole.

49. A logic set for locking conduit data and an analyzer program that analyzes the conduit data, the apparatus including:
  first logic to generate a first key;
  second logic to associate the first key with both specific conduit data and a specific copy of the analyzer program; and
  third logic to generate gatekeeper logic that, utilizing at least the first key, prevents the specific copy of the analyzer program from analyzing conduit data other than the specific conduit data.

50. The logic set of claim 49 wherein the third logic generates a second key utilizing the first key and a characteristic value representative of a characteristic of the specific conduit data, and associates the second key with the specific conduit data.

51. The logic set of claim 49 wherein the first logic comprises a random number generator.

52. The logic set of claim 49 wherein the second logic comprises a compiler that compiles the specific copy of the analyzer program to incorporate the gatekeeper logic.

53. The logic set of claim 49 wherein the second logic comprises a compiler that compiles the specific copy of the analyzer program to incorporate the first key.

54. The logic set of claim 49 wherein the third logic comprises a locking routine.

55. An apparatus for locking conduit data and an analyzer program that analyzes the conduit data, the apparatus including:
  first means for generating a first key;
  second means for associating the first key with both specific conduit data and a specific copy of the analyzer program; and
  third means for generating gatekeeper logic that, utilizing at least the first key, prevents the specific copy of the analyzer program from analyzing conduit data other than the specific conduit data.

56. A logic set for executing an analyzer program to analyze conduit data to which it is locked, the apparatus including:
   first logic to identify a first key associated with a specific copy of an analyzer program;
   second logic to identify a second key associated with specific conduit data;
   third logic to determine a characteristic parameter representative of a characteristic of the specific conduit data;
   fourth logic to derive a gate key utilizing the second key and the characteristic parameter; and
   fifth logic to allow executing of the specific copy of the analyzer program to analyze the specific conduit data if the gate key corresponds to the first key.

57. A logic set for executing an analyzer program to analyze conduit data to which it is locked, the apparatus including:
   first logic to identify a first key associated with a specific copy of an analyzer program;
   second logic to identify a second key associated with specific conduit data;
   third logic to determine a characteristic parameter representative of a characteristic of the specific conduit data;
   fourth logic to derive a gate key utilizing the first key and the characteristic parameter; and
   fifth logic to allow execution of the specific copy of the analyzer program to analyze the specific conduit data if the gate key corresponds to the second key.

58. An apparatus for executing an analyzer program to analyze conduit data to which it is locked, the apparatus including:
   first means for identifying a first key associated with a specific copy of an analyzer program;
   second means for identifying a second key associated with specific conduit data;
   third means for determining a characteristic parameter representative of a characteristic of the specific conduit data;
   fourth means for deriving a gate key utilizing the second key and the characteristic parameter; and
   fifth means for allowing execution of the specific copy of the analyzer program to analyze the specific conduit data if the gate key corresponds to the first key.

59. An apparatus for executing an analyzer program to analyze conduit data to which it is locked, the apparatus including:
   first means for identifying a first key associated with a specific copy of an analyzer program;
   second means for identifying a second key associated with specific conduit data;
   third means for determining a characteristic parameter representative of a characteristic of the specific conduit data;
   fourth means for deriving a gate key utilizing the first key and the characteristic parameter; and
   fifth means for allowing execution of the specific copy of the analyzer program to analyze the specific conduit data if the gate key corresponds to the second key.

60. A machine-readable medium having a sequence of instructions stored thereon that, when executed by a machine, cause the machine to perform the steps of:
   generating a first key;
   associating the first key with both specific conduit data and a specific copy of an analyzer program; and
   generating gatekeeper logic that, utilizing at least the first key, prevents the specific copy of the analyzer program from analyzing conduit data other than the specific conduit data.

61. A machine-readable medium having a sequence of instructions stored thereon that, when executed by a machine, cause the machine to perform the steps of:
   determining a first key associated with a specific copy of an analyzer program;
   determining a second key associated with specific conduit data;
   determining a characteristic parameter representative of a characteristic of the specific conduit data;
   deriving a gate key utilizing the second key and the characteristic parameter; and
   allowing execution of the specific copy of the analyzer program to analyze the specific conduit data if the gate key corresponds to the first key.

62. A machine-readable medium having a sequence of instructions stored thereon that, when executed by a machine, cause the machine to perform the steps of:
   determining a first key associated with a specific copy of an analyzer program;
   determining a second key associated with specific conduit data;
   determining a characteristic parameter representative of a characteristic of the specific conduit data;
   deriving a gate key utilizing the second key and the characteristic parameter; and
   allowing execution of the specific copy of the analyzer program to analyze the specific conduit data if the gate key corresponds to the second key.

63. A machine-readable medium having a sequence of instructions stored thereon that, when executed by a machine, cause the machine, in response to a user request received over a communications network, to perform the steps of:
   automatically providing, over the communications network, a user of the analyzer program with a specific copy of the analyzer
   program and specific conduit data that are locked utilizing at least a first key; and
   automatically providing, over the communications network, the user of the analyzer program with gatekeeper logic that, utilizing at least the first key, allows the specific copy of the analyzer program to analyze only the specific conduit data, wherein the first key is associated with both the specific copy of analyzer program and the specific conduit data.

64. A machine-readable medium having a sequence of instructions stored thereon that, when executed by a machine, cause the machine, in response to a user request received over a communications network, to perform the steps of:
   automatically locking a specific copy of an application program to specific conduit data so that the specific copy of the application program application program is able to access only the specific conduit data; and
   automatically distributing the locked specific copy of the application program and specific conduit data to a user.

65. A method of locking a data and a program that processes the data, comprising:
   generating a first key;
   associating the first key with the data and a copy of the program; and generating a gatekeeper logic that, utilizing at least the first key, prevents the copy of the program from processing data other than the data associated with the first key.

66. The method of claim 65 wherein generating the first key includes generating a random character sequence.

67. The method of claim 66 wherein the random character sequence is a random number sequence.

68. The method of claim 65 wherein associating the first key with the data includes generating a second key utilizing the first key and a characteristic value for a characteristic parameter representative of a characteristic of the data.

69. The method of claim 68 including, responsive to a modification of the characteristic value, re-generating the second key utilizing the modified characteristic value.

70. The method of claim 68 including incorporating the second key within a header of a data file including the data.

71. The method of claim 65 wherein associating the first key with the specific copy of the program includes compiling the copy of the program to incorporate the first key.

72. The method of claim 65 wherein generating the gatekeeper logic includes associating the gatekeeper logic with the copy of the program.

73. The method of claim 72 wherein associating the gatekeeper logic with the copy of the program includes compiling the copy of the program to incorporate the gatekeeper logic.

74. The method of claim 65 wherein generating the gatekeeper logic comprises generating a Java-programming language application that is incorporated within the copy of the program.

75. The method of claim 65 wherein a supplier of the program performs locking of the data to the copy of the program, the data provided to the supplier by a user.

76. The method of claim 75 wherein the supplier provides the copy of the program and the data locked to the copy of the program to the user.

77. The method of claim 65 wherein a supplier of the program supplies a locking logic and the copy of the program to a user, and a locking of the data to the copy of the program occurs on a computer system of the user utilizing the supplied locking logic and the supplied program.

* * * * *

UNITED STATES PATENT AND TRADEMARK OFFICE
CERTIFICATE OF CORRECTION

PATENT NO. : 6,941,464 B1 Page 1 of 1
DATED : September 6, 2005
INVENTOR(S) : Colleen A. Barton, Daniel Moos and Mark Zoback It is certified that error appears in the above-identified patent and that said Letters Patent is hereby corrected as shown below:

Title page,
Item [75], Inventor, please add inventor -- Mark Zoback --.

Signed and Sealed this

Twenty-second Day of November, 2005

JON W. DUDAS
*Director of the United States Patent and Trademark Office*